United States Patent [19]

Maxson

[11] Patent Number: 4,857,564
[45] Date of Patent: Aug. 15, 1989

[54] HIGH CONSISTENCY ORGANOSILOXANE ELASTOMER COMPOSITIONS CURABLE BY A PLATINUM-CATALYZED HYDROSILATION REACTION

[75] Inventor: Myron T. Maxson, Midland, Mich.

[73] Assignee: Dow Corning Corporation, Midland, Mich.

[21] Appl. No.: 250,583

[22] Filed: Sep. 29, 1988

[51] Int. Cl.$^4$ .................................................. C08K 9/06
[52] U.S. Cl. ...................................... 523/212; 523/216; 524/188; 524/265; 524/267; 524/588; 525/478; 528/15; 528/31; 528/32
[58] Field of Search ............... 523/212, 216; 525/478; 524/188, 265, 267, 588; 528/15, 31, 32

[56] References Cited

U.S. PATENT DOCUMENTS

| 3,671,480 | 6/1972 | Wada et al. | 260/37 |
| 4,089,833 | 5/1978 | Simpson | 260/37 |
| 4,463,118 | 7/1984 | Evans et al. | 524/264 |
| 4,585,848 | 4/1986 | Evans et al. | 525/15 |

OTHER PUBLICATIONS

Abstract—U.S. Pat. No. 4,585,848.

Primary Examiner—Melvyn I. Marquis
Attorney, Agent, or Firm—Robert Spector

[57] ABSTRACT

The presence of an incompatible liquid, polydiorganosiloxane wherein from 1 to 30 percent of the siloxane units contain an ethylenically unsaturated hydrocarbon radical in high-consistency organosiloxane compositions that cure by a platinum-catalyzed hydrosilation reaction substantially improves the tear strength and elongation of cured elastomers prepared from these compositions.

5 Claims, No Drawings

HIGH CONSISTENCY ORGANOSILOXANE ELASTOMER COMPOSITIONS CURABLE BY A PLATINUM-CATALYZED HYDROSILATION REACTION

BACKGROUND OF THE INVENTION

1. Field of the Invention

This invention relates to high consistency organosiloxane compositions. More particularly, this invention relates to improved high consistency organosiloxane compositions that cure by a platinum-catalyzed hydrosilation reaction to yield cured products exhibiting better physical properties, particularly tear strength, relative to prior art compositions.

2. Description of the Prior Art

High consistency organosiloxane elastomer compositions are known in the art. These compositions typically contain at least one polydiorganosiloxane having a viscosity of at least 1000 Pa.s (equivalent to the consistency of a gum), a reinforcing silica filler, an optional silica treating agent to prevent an irreversible thickening referred to as "creping" during processing of the curable composition, and a curing agent. The curing agent for high consistency organosiloxane compositions is typically an organic peroxide. Compositions of this type are cured by heating them above the decomposition temperature of the organic peroxide.

U.S. Pat. No. 4,089,833, which issued to Simpson on May 16, 1978 teaches that high consistency organosiloxane compositions can be cured either by organic peroxides or a platinum-catalyzed hydrosilation reaction. The compositions curable by the hydrosilation reaction include a vinyl-containing polydiorganosiloxane, and, as the curing agent, an organohydrogensiloxane. The two types of polydiorganosiloxanes disclosed in this patent are (1) a polydiorganosiloxane having a viscosity of from 500,000 to 200,000,000 centipoise (500 to 200,000 Pa.s) that contains silicon-bonded lower alkyl and vinyl radicals and from 5 to 50 mole percent, based on the total number of silicon-bonded organic groups, of 3,3,3-trifluoropropyl radicals and (2) a non-halogenated "process aid". The process aid is defined as "a diorganopolysiloxane having a viscosity varying from 100,000 to 10,000,000 centipoise at 25° C. where the organic groups are selected from alkyl radicals, vinyl radicals, phenyl radicals and mixtures thereof, and wherein the vinyl unsaturation varies from 5 to 25 percent". The compositions also include a reinforcing silica filler. The process aid prevents the composition from sticking to or partitioning on processing equipment.

The aforementioned patent issued to Simpson does not distinguish between compositions cured using an organic peroxide and those cured by a platinum-catalyzed hydrosilation reaction. The latter class of compositions are not exemplified.

U.S. Pat. No. 3,671,480, which issued to Wada on June 20, 1972 teaches heat curable organosiloxane elastomer compositions comprising 2 different vinyl-containing polydiorganosiloxanes, a polyorganohydrogensiloxane and a platinum-containing catalyst. One of the two vinyl-containing polymers is a gum having a degree of polymerization greater than 3000 and containing from 0.02 to 0.2 mole percent of vinyl radicals. The second vinyl-containing polymer contains at least 2 mole percent vinyl radicals and has a degree of polymerization less than 100, which encompasses only liquid polydiorganosiloxanes. Two of the four exemplified compositions contain mixtures of a gum and a liquid polydiorganosiloxane as the two vinyl-containing polymers, however none of the exemplified compositions contain two immiscible vinyl-containing polydiorganosiloxanes.

The use of a low molecular weight, vinyl-substituted polydimethylsiloxane "oil" to extend the processing temperature range of a specified class of peroxide curable organosiloxane compositions and the tear resistance of cured elastomers prepared from these compositions is taught in U.S. Pat. No. 4,463,118, which issued on July 31, 1984 to Evans and Razzano. The curable polymer in these compositions is a silarylenesiloxane/diorganosiloxane block copolymer wherein the silarylenesiloxane units contains at least one pair of silicon atoms joined by a arylene hydrocarbon radical. Among the list of silicon-bonded monovalent hydrocarbon radicals that can be present on the copolymer are halogenated radicals such as 3,3,3-trifluoropropyl. The polydimethylsiloxane oils contain less than one mol percent of vinyl radicals and preferably exhibit a viscosity of from 0.5 to 25 Pa.s.

An objective of the present invention is to improve the physical properties, particularly tear strength and elongation, of high consistency organosiloxane compositions. It has now been found that this objective can be achieved by including in the composition a vinyl-containing liquid polydiorganosiloxane that is immiscible with the gum-type polydiorganosiloxane comprising the major organosiloxane ingredient of the composition. Contrary to the teaching in the aforementioned patent to Simpson, the method used to cure the composition has a profound effect on the physical properties of the cured elastomer.

SUMMARY OF THE INVENTION

This invention provides curable composition comprising a mixture of a gum-type polydiorganosiloxane wherein from 0.1 to 3 mol percent of the non-terminal siloxane units contain an aliphatically unsaturated hydrocarbon radical, and a liquid diorganovinylsiloxy-terminated polydiorganosiloxane that is immiscible with the gum-type polydiorganosiloxane and contains aliphatically unsaturated hydrocarbon radicals on from 5 to 30 percent of the non-terminal silicon atoms. The compositions are cured by reacting with an organohydrogensiloxane in the presence of a platinum-catalyzed hydrosilation catalyst.

DETAILED DESCRIPTION OF THE INVENTION

This invention provides an improved organosiloxane elastomer composition comprising the product obtained by blending to homogeneity A. 100 parts by weight of a polydiorganosiloxane gum containing from 0.1 to 3 mol percent, based on the weight of said gum, of non-terminal siloxane units containing an aliphatically unsaturated hydrocarbon radical, B. an amount sufficient to cure said composition of an organohydrogensiloxane that is miscible with said polydiorganosiloxane gum and contains an average of more than 2 silicon-bonded hydrogen atoms per molecule, C. a platinum-containing hydrosilation catalyst in an amount sufficient to promote curing of said composition, D. from 20 to 100 parts by weight of a reinforcing silica, and E. an amount of silica treating agent sufficient to avoid crepe hardening of said composition, where the improvement comprises the presence in said composition of (1) from 0.1 to 5 parts by weight per 100 parts by weight of said polydiorganosiloxane gum of a liquid polydiorganosiloxane exhibiting a viscosity of less than 1,000 Pa.s at 25° C., where said liquid polydiorganosiloxane and said gum are incompatible and immiscible with one another, and said liquid polydiorganosiloxane contains from 5 to 30 mol percent of siloxane groups having an aliphatically unsaturated hydrocarbon radical bonded to silicon.

This invention also provides an improved two-part curable organosiloxane elastomer composition comprising ingredients A through E defined hereinabove, with the proviso that the organohydrogensiloxane and the hydrosilation catalyst are packaged in different parts of said two-part composition. These two materials are separated to avoid premature curing of the composition during long term storage. It is known that organosiloxanes containing aliphatically unsaturated hydrocarbon radicals will gradually react with organohydrogensiloxanes in the presence of a platinum-containing catalyst under ambient conditions even when a platinum catalyst inhibitor is present in the composition.

1. The Polydiorganosiloxanes Containing Aliphatically Unsaturated Hydrocarbon Radicals The inventive feature considered responsible for the unique combination of physical properties exhibited by cured elastomers prepared from the present curable composition is the presence in the composition a gum type and a liquid polydiorgano-siloxanes that are immiscible with one another. The first of these two polydiorganosiloxanes, referred to hereinafter as ingredient A, has the consistency of a gum at 25° C. These type of polymers are typically characterized in terms of a Williams Plasticity Number that is generally between 50 and about 300 mm., measured in accordance with ASTM Test Procedure No. D 926.

From 0.1 to 3 mole percent of the non-terminal diorganosiloxane units in ingredient A contain a monovalent, aliphatically unsaturated hydrocarbon radical. Ingredient A can be represented by the general formula

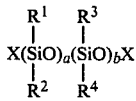

where $R^1$, $R^2$ and $R^3$ are free of aliphatic unsaturation and individually represent monovalent hydrocarbon radicals or halogenated monovalent hydrocarbon radicals, $R^4$ represents an monovalent aliphatically unsaturated hydrocarbon radical, X represents a hydroxyl group, $R^1$ or $R^4$, the value of a is at least 500, the sum of a and b is equivalent to a Williams Plasticity Number of from 50 to 300, and the value of $b/a+b$ is from 0.001 to 0.03.

$R^1$, $R^2$ and $R^3$ can represent any monovalent hydrocarbon or halogenated hydrocarbon radical that is free of aliphatic unsaturation and typically contains from one to about 20 carbon atoms. These radicals include but are not limited to methyl, ethyl, propyl, cyclohexyl, phenyl, benzyl, and any of these radicals containing one or more halogen atoms.

The aliphatically unsaturated hydrocarbon radicals represented by $R^4$ contain from 2 to about 20 carbon atoms and include vinyl, allyl and butenyl, with vinyl being preferred based on the availability and cost of the intermediates used to prepare polydiorganosiloxanes containing these radicals.

Preferred embodiments of ingredient A include dimethylvinylsiloxy-terminated copolymers containing from 0.1 to 3 mole percent of methylvinylsiloxane units, the remaining non-terminal units being dimethylsiloxane, methyl-3,3,3-trifluoropropylsiloxane, or a combination of these two units. Most preferably at least 75 mole percent of the repeating units of ingredient A are methyl-3,3,3-trifluoropropylsiloxane units and the Williams plasticity number for the polydiorganosiloxane is from 100 to 200.

Polydiorganosiloxane gums, including those suitable for use as ingredient A of the present compositions, are typically prepared by polymerizing a corresponding diorganocyclosiloxane, such as 2,4,6-tris(3,3,3-trifluoropropylmethyl)cyclotrisiloxane. The polymerization is conducted in the presence of an acid or base catalyst, a controlled amount of water and a precursor of the terminal group, such as sym-tetramethyldivinyldisiloxane. Alternatively, the corresponding halosilane(s) are polymerized in the presence of a suitable catalyst and an acid acceptor.

The second of the two ethylenically unsaturated polydiorganosiloxanes, referred to herein as ingredient B, is a liquid material that is immiscible with ingredient A and is present at a concentration of from 0.1 to about 5 parts by weight per 100 parts of ingredient A. Below a level of about 0.1 part there is typically little if any noticeable improvement in the physical properties of the cured elastomer relative to one obtained by curing ingredient A with an organic peroxide. These physical properties of preferred cured compositions appear to reach a maximum at a concentration level of between 1.5 and 3 parts, and begin to decrease at higher concentrations. Ingredient B can be represented by the average general formula

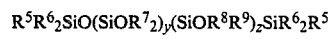

where $R^5$ and $R^8$ represent identical or different monovalent aliphatically unsaturated hydrocarbon radicals, and $R^6$, $R^7$ and $R^9$ are monovalent hydrocarbon radicals or monovalent halogenated hydrocarbon radicals and are free of aliphatic unsaturation.

The substituents represented by $R^6$, $R^7$ and $R^9$ are selected with the objective of having ingredients A and B immiscible with one another. To achieve this objective at least 20 mol percent, preferably about 50 mol percent of the hydrocarbon radicals present in ingredient A are members of a different class of hydrocarbon radicals than the majority of the hydrocarbon radicals present in ingredient B, e.g. halogenated alkyl or phenyl vs. non-halogenated lower alkyl. The two incompatible classes of hydrocarbon radicals are preferably fluoroalkyl and lower alkyl, most preferably 3,3,3-trifluoropropyl and methyl.

The degree of polymerization represented by the sum of y and x is up to and including 2000, this value being equivalent to a viscosity of less than 1000 Pa.s at 25° C., thereby satisfying the requirement that ingredient B be a liquid under ambient conditions. This viscosity value is preferably from 0.1 to 100 Pa.s, most preferably from 0.1 to 10 Pa.s. The ratio $z/(y+z)$ is from 0.05 to 0.30, which is equivalent to the presence of a vinyl radical on from 5 to 30 percent of the non-terminal silicon atoms.

Preferred embodiments of ingredient B include but are not limited to dimethylvinylsiloxy-terminated dimethylsiloxane/methylvinylsiloxane copolymers and dimethylvinylsiloxy-terminated methyl-3,3,3-trifluoropropylsiloxane/methylvinylsiloxane copolymers.

Ingredient B can be prepared using the same methods described hereinabove in connection with ingredient A, the primary differences being the requirement for a shorter reaction time and a higher relative concentration of chain-terminating agent for ingredient B.

In preferred embodiments of the present compositions ingredient A is a dimethylvinylsiloxy-terminated 3,3,3-trifluoropropylmethylsiloxane/methylvinylsiloxanee copolymer containing from 0.1 to 1 mole percent of methylvinylsiloxy units and ingredient B is a dimethylvinylsiloxy-terminated dimethylsiloxane/methylvinylsiloxane copolymer containing from about 20 to 25 mole percent of methylvinylsiloxy units.

2. The Organohydrogensiloxane Curing Agent

The organosiloxane compositions of this invention are cured by a platinum catalyzed hydrosilation reaction. The curing agent is an organohydrogensiloxane containing an average of more than two silicon bonded hydrogen atoms per molecule. The organohydrogensiloxane contains from as few as four silicon atoms per molecule up to an average of 20 or more, and can have a viscosity of up to 10 Pa.s or higher at 25° C. The repeating units of this ingredient include but are not limited to $HSiO_{1.5}$, $R^{10}HSiO$ and/or $R^{10}_2HSiO_{0.5}$ in addition to one or more of monoorganosiloxy, diorganosiloxane, triorganosiloxy and $SiO_{4/2}$ units. In these formulae $R^{10}$ represents a monovalent hydrocarbon or halogenated hydrocarbon radical as defined hereinabove for the $R^1$ radical of ingredient A. To ensure adequate curing of the composition $R^{10}$ is selected from the same class of hydrocarbon or halogenated hydrocarbon radicals as $R^1$.

Alternatively the organohydrogensiloxane can be a cyclic compound containing diorganosiloxane and organohydrogensiloxane units or a compound of the formula $Si(OSiR^{10}_2H)_4$.

The molar ratio of silicon bonded hydrogen atoms to vinyl or other aliphatically unsaturated hydrocarbon radicals in compositions curable by a hydrosilation reaction is critical with respect to the properties of the cured elastomer. Given the molecular weights of ingredients A and B, the optimum ratio for the present curable compositions will be determined at least in part by the concentration of ethylenically unsaturated hydrocarbon radicals in ingredients A and B and the type of curing agent. This optimum value can readily be determined by those skilled in the art with a minimum of experimentation, and is not part of this invention.

For preferred compositions of this invention the molar ratio of silicon bonded hydrogen atoms to vinyl and/or other aliphatically unsaturated hydrocarbon radicals is between 1.3 and 2.

3. The Platinum Hydrosilation Catalyst and Optional Inhibitor

Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned ingredients A and B, curing agents and platinum-containing catalysts may begin to cure at ambient temperature. To increase the storage stability of these compositions or obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol and ethynylcyclohexanol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1876 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

4. The Reinforcing Silica Filler and Silica Treating Agents

The curable organosiloxane compositions of this invention contain a reinforcing silica filler to improve the physical strength of both the composition and cured elastomers prepared from these composition. Reinforcing silica fillers have a surface area of from 50 to greater than 400 m²/g. These reinforcing silica filler are well known in the art and can be obtained commercially, Examples of reinforcing silicas include the fume and precipitated varieties of silica.

The amount of reinforcing filler in the composition can vary from 20 to as much as 100 parts by weight with the usual amount varying between 15 to 75 parts by weight per 100 parts by weight of the polydiorganosiloxane gum.

Reinforcing silica fillers are typically treated with a low molecular weight organosilicon compound to prevent a phenomenon referred to as "creping" or "crepe hardening". These silica treating agents reduce the interaction between the polydiorganosiloxane and the reinforcing silica that causes the base to undergo an irreversible increase in viscosity during processing, to the extent that it is no longer processible using conventional techniques.

Suitable silica treating agents are well known in the art, and include but are not limited to hydroxyl terminated short chain polydiorganosiloxane fluids and hexaorganodisilazanes. At least 90 weight percent of the silica treating agent should be compatible with the polydiorganosiloxane gum referred to hereinbefore as ingredient A. The silica treating agent typically constitutes from about 2 up to about 15 percent by weight of the curable composition.

In accordance with a preferred embodiment of this invention up to about 10 weight percent of the silica treating agent is an organosilicon compound that is incompatible with the polydiorganosiloxane gum and contains vinyl or other ethylenically unsaturated hydrocarbon radicals bonded to at least a portion of the silicon atoms.

5. Preparation of Curable Compositions

The silica filler can be treated in the presence of at least one of the vinyl-containing polydiorganosiloxane(s) by blending these ingredients together with the filler and treating agents until the filler is completely treated and uniformly dispersed throughout the composition to form a homogeneous material. The composition of a typical homogeneous material will not vary significantly when sampled at random locations throughout the material. This blending operation can require anywhere from 15 minutes to 2 hours, depending upon the amount of material being processed, the viscosity of the material and the shear rate to which the material is subjected during processing.

Alternatively, treatment of the silica can occur before the silica is blended with the other ingredients of the present compositions. Methods for treating finely divided silica fillers prior to incorporating the silica into a polyorgano-siloxane composition are known in the art.

Irrespective of the type of mixer used, blending of the polydiorganosiloxanes, silica and silica treating agent is continued while the composition is heated at temperatures from about 100 to 250 degrees C. under reduced pressure to remove volatile materials. Curable compositions of this invention are prepared by blending the resultant mixture with the organohydrogensiloxane and the hydrosilation catalyst.

Because compositions containing ingredients A, B, an organohydrogensiloxane and a platinum-containing hydrosilation catalyst may begin to cure under ambient conditions, it is desirable to package the present compositions in two parts to achieve long term storage stability. Both parts typically contain ingredient A and the reinforcing silica filler that has been treated with at least one of the aforementioned silica treating agents, and at least one of the parts contains ingredient B. Storage stability is achieved by packaging the organohydrogensiloxane and the hydrosilation catalyst in separate parts of the composition.

The following examples are intended to describe preferred embodiment of the present invention and should not be interpreted as limiting the scope of the invention as defined in the accompanying claims. Unless otherwise specified all parts and percentages specified in the examples are by weight and viscosities were measured at 25 degrees C.

EXAMPLE 1

This example demonstrates the unexpected increase in physical properties achieved by curing a preferred composition of this invention using a platinum-catalyzed hydrosilation reaction instead of an organic peroxide.

An organosiloxane composition was prepared by blending the following ingredients to homogeneity.

64.2 parts of a hydroxyl-terminated copolymer containing 99.4 mol percent methyl-3,3,3-trifluoropropylsiloxane units, 0.6 mol percent methylvinylsiloxane units and exhibiting a Williams plasticity number of about 115 (ingredient A), 1.2 parts of a dimethylvinylsiloxy-terminated liquid organosiloxane copolymer containing 78 mol percent of dimethylsiloxane units, 22 mol percent of methylvinylsiloxane units and exhibiting a viscosity of about 15 Pa.s (ingredient B), 25.7 parts of a fume silica exhibiting a nominal surface area of 250 m²/g., as silical treating agent 1, 8.5 parts of a hydroxyl-terminated polymethyl-3,3,3-trifluoropropylsiloxane exhibiting a viscosity of 0.1 Pa.s, as silica treating agent 2, 0.2 part of a hydroxyl endblocked polymethylvinylsiloxane having about 4 weight percent of hydroxyl groups, as the curing agent, 1.06, 1.62 or 2.16 parts of a linear dimethylhydrogensiloxy-terminated polyorganohydrogen-siloxane containing an average of from one to about five repeating units per molecule of the formula

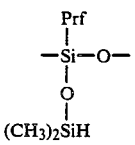

where Prf represents a 3,3,3-trifluoropropyl radical, 0.05 part of a catalyst containing 0.67 weight percent platinum derived from the reaction of hexachloroplatinic acid and a liquid vinyl-containing polydiorganosiloxane, 0.02 part of 2-methyl-3-butyn-2-ol as a platinum catalyst inhibitor, and 0.03 part of ammonium carbonate The control composition was prepared by replacing the curing agent, catalyst and catalyst inhibitor in the composition described in the preceding section of this example with 1 part of 2,5-bis(tert-butylperoxy)-2,5-dimethylhexane.

Test samples for measuring the physical properties reported in the accompanying table 1 were prepared by molding each of the four compositions individually at a temperature of 171° C. in a hydraulic press under a pressure of about 20,000 psi (138 MPa) for 10 minutes and then post-curing the samples for 4 hours in an oven maintained at a temperature of 200° C.

Tensile strength and elongation were measured using the procedure of ASTM D412, die B tear strength was measured using the procedure of ASTM D1938 and the durometer hardness was measured using the procedure of ASTM D 2240 and the Shore A scale.

TABLE 1

| Sample | Curing Agent (Pts.) | Tensile Strength (MPa) | Elongation (%) | Tear Strength (kN/m) | Durometer |
|---|---|---|---|---|---|
| 1 | 1.06 | 6.9 | 455 | 42.7 | 49 |
| 2 | 1.62 | 7.6 | 390 | 42.5 | 54 |
| 3 | 2.16 | 8.5 | 430 | 48.4 | 56 |
| 4* | 1.0* | 8.1 | 297 | 22.2 | 55 |

\* - Control sample
The tear strength and elongation of control sample 4 were considerably lower than the values exhibited by the samples 1, 2 and 3 prepared using compositions of this invention.

EXAMPLE 2

This example demonstrates the effect of using a liquid polydiorganosiloxane that is outside the scope of the present invention and the effect of exceeding the present upper concentration limit for ingredient B.

Compositions were prepared by blending to homogeneity the quantities of ingredients listed in the following Table 3 with 23.2 parts of silica treating agent 1, 0.56 parts of silica treating agent 2, and 70 parts of fume silica, all of which are described in Example 1.

Ingredients A and B are the same ingredients used in Example 1. Ingredient B' is a liquid dimethylvinylsiloxy-terminated methylvinylsiloxane/methyl-3,3,3-trifluoropropylsiloxane copolymer containing 17 mol percent of methylvinylsiloxy unit and exhibiting a viscosity of 4.9 Pa.s. Ingredients A and B' are miscible with one another.

To 100 parts of each composition listed in table 2 was added the amount of curing agent shown in Table 3 together with 0.2 part of the platinum catalyst described in Example 1, and the resultant samples were cured as described in Example 1. The curing agent was prepared by blending to homogeneity 50 parts of the organohydrogensiloxane described in example 1, 0.67 parts of ethynylcyclohexanol, 10.6 parts of a fume type silica having a surface area of from 200 to 250 m$^2$ per gram that had been previously treated with hexamethyldisilazane and, as a heat stabilizer, 33 parts of the product obtained by blending to homogeneity 100 parts by weight of a hydroxyl-terminated polydimethylsiloxane gum exhibiting a Williams plasticity number of about 145 and 100 parts of hydrated cerric oxide.

The composition of each of the four materials evaluated is summarized in Table 2 and the properties of the cured elastomers are summarized in Table 3.

TABLE 2

| Composition | Ingredient A | B | B' |
|---|---|---|---|
| 5 | 200 | 3.1 | 0 |
| 6* | 200 | 0 | 3.1 |
| 7* | 200 | 0 | 9.5 |
| 8** | 200 | 6.2 | 0 |

\* = Control Samples (for comparative purposes)
\*\* = Concentration of ingredient B exceeds present limit of 3 percent, based on weight of ingredient A.

TABLE 3

| Sample | Curing Agent (Pts.**) | Tensile Strength (MPa) | Elongation (%) | Tear Strength (kN/m) | Durometer (Shore A) |
|---|---|---|---|---|---|
| 5 | 3.7 | 9.3 | 428 | 32.7 | 45 |
| 6* | 3.15 | 9.4 | 480 | 29.2 | 43 |
| 7* | 4.63 | 7.0 | 347 | 30.0 | 49 |
| 8** | 5.188 | 8.7 | 372 | 27.8 | 53 |

\* = Control Samples (for comparative purposes)
\*\* = Based on 100 parts of composition listed in Table 2

EXAMPLE 3

This example demonstrates the effect of (1) replacing the gum type polydiorganosiloxane referred to hereinbefore as ingredient A with a polydiorganosiloxane (ingredient A') that is substantially free of aliphatically unsaturated hydrocarbon radicals or (2) omitting the immiscible liquid polyorganosiloxane referred to hereinbefore as ingredient B.

Compositions were prepared using ingredients A and B of example 2 in the amounts specified in the following Table 4. Ingredient A' is a hydroxyl terminated poly(methyl-3,3,3-trifluoropropyl)siloxane that is substantially free of non-terminal aliphatically unsaturated hydrocarbon radicals and exhibits a Williams plasticity number of 120. The composition of the curing agent is disclosed in the preceding Example 2. The weight percent vinyl in the composition is also specified in Table 4. The resultant compositions were then blended to homogeneity with the amount of curing agent specified in Table 5, and samples were prepared and evaluated as described in Example 1.

TABLE 4

| Composition | Ingredient A | A' | B | % Vinyl |
|---|---|---|---|---|
| 9* | 200 | 0 | 0 | 0.13 |
| 10 | 200 | 0 | 1.6 | 0.17 |
| 11* | 0 | 200 | 3.1 | 0.14 |

\* = Control Sample (for comparative purposes)

TABLE 5

| Sample | Curing Agent (Pts.**) | Tensile Strength (MPa) | Elongation (%) | Tear Strength (kN/m) | Durometer (Shore A) |
|---|---|---|---|---|---|
| 9* | 4.74 | 9.0 | 436 | 25.2 | 37 |
| 10 | 6.18 | 9.8 | 450 | 33.0 | 41 |
| 11* | 5.08 | 0.30 | 96 | 2.6 | 20 |

\*\* = Based on 200 parts of combined weight of ingredients A or A', B, reinforcing silica and silica treating agents.

That which is claimed is:

1. In an improved curable silicone elastomer composition comprising the product obtained by blending to homogeneity
   A. 100 parts by weight of a polydiorganosiloxane gum wherein from 0.1 to 3 mol percent of the non-terminal siloxane contain an aliphatically unsaturated hydrocarbon radical,
   B. an amount sufficient to cure said composition of an organohydrogensiloxane that is miscible with said polydiorganosiloxane gum and contains an average of more than 2 silicon-bonded hydrogen atoms per molecule,
   C. a platinum-containing hydrosilation catalyst in an amount sufficient to promote curing of said composition,
   D. from 20 to 100 parts by weight of a reinforcing silica, and E. an amount of silica treating agent sufficient to avoid crepe hardening of said composition, where the improvement comprises the presence in said composition of (1) from 0.1 to 5 parts by weight per 100 parts by weight of said polydiorganosiloxane gum of a liquid polydiorganosiloxane exhibiting a viscosity of less than 1,000 Pa.s at 25° C., where said liquid polydiorganosiloxane and said gum are incompatible and immiscible, and said liquid polydiorganosiloxane contains from 5 to 30 mole percent of siloxane groups having an aliphatically unsaturated hydrocarbon radical bonded to silicon.

2. A composition according to claim 1 where (1) said polydiorganosiloxane gum is represented by the general formula

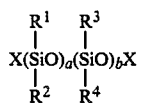

where $R^1$, $R^2$ and $R^3$ are free of aliphatic unsaturation and represent identical or different monovalent hydrocarbon radicals or halogenated monovalent hydrocarbon radicals, $R^4$ represents a monovalent aliphatically unsaturated hydrocarbon radical, X represents $R^1$, $R^4$, or a hydroxyl group, the value of a is at least 500, the sum of a and b is equivalent to a Williams plasticity number of from 50 to 300, the value of $b/a+b$ is from 0.001 to 0.03, (2) the liquid polydiorganosiloxane is represented by the general formula

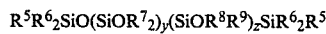

where $R^5$ and $R^8$ represent identical or different monovalent aliphatically unsaturated hydrocarbon radicals, $R^6$, $R^7$ and $R^9$ are monovalent hydrocarbon radicals or monovalent halogenated hydrocarbon radicals and are free of aliphatic unsaturation, the degree of polymerization represented by the sum of y and z is up to and including 2000, the equivalent of a viscosity at 25° C. of less than 1000 Pa.s, and the ratio $z/(y+z)$ is from 0.05 to 0.30, (3) the organohydrogensiloxane contains repeating units selected from the group consisting of $HSiO_{1.5}$, $R^{10}HSiO$, and $R^{10}{}_2HSiO_{0.5}$ in addition to at least one selected from the group consisting of monoorganosiloxy, diorganosiloxane, triorganosiloxy and $SiO_{4/2}$ units, where $R^{10}$ represents a monovalent hydrocarbon or halogenated hydrocarbon radical selected from the same group as $R^1$, (4) the molar ratio of vinyl or other ethylenically unsaturated hydrocarbon radical is from 1.3 to 2, inclusive, (5) the concentration of hydrosilation catalyst is equivalent to from 5 to 50 parts by weight of platinum per million parts of curable composition, (6) the concentration of reinforcing silica is from 20 to 100 parts by weight per 100 parts of polydiorganosiloxane gum, and (7) the total weight of silica treating agent constitutes from 2 to 15 percent by weight of said curable composition.

3. A composition according to claim 2 where said polydiorganosiloxane gum is a dimethylvinylsiloxy-terminated copolymer containing from 0.1 to 3 mole percent of methylvinylsiloxy units, the remainder being dimethylsiloxane, methyl-3,3,3-trifluoropropylsiloxane, or a combination of these two units, the Williams plasticity number of said copolymer is from 100 to 200, at least 20 percent of the hydrocarbon radicals present in the polydiorganosiloxane gum are members of a different class of hydrocarbon radicals relative to at least half of the hydrocarbon radicals present in said liquid polydiorganosiloxane, the viscosity of the liquid polydiorganosiloxane is from 0.1 to 100 Pa.s, the concentration of the liquid polydiorganosiloxane is from 1.5 to 3 parts by weight per 100 parts by weight of said polydiorganosiloxane gum, said composition includes a platinum catalyst inhibitor, and up to 10 weight percent of the silica treating agent is incompatible with the polydiorganosiloxane gum.

4. A composition according to claim 3 where 75 mol percent of the repeating units of said polydiorganosiloxane gum are methyl-3,3,3-trifluoropropylsiloxane units, the viscosity of said liquid polydiorganosiloxane is from 0.1 to 10 Pa.s, at least 50 mol percent of the silicon-bonded hydrocarbon radicals present in said liquid polydiorganosiloxane are methyl, and said catalyst is a complex of hexachloroplatinic acid with a relatively low molecular weight vinyl-containing organosiloxane compound.

5. A composition according to claim 1 where said curable composition is in two parts, both of which contain said polydiorganosiloxane gum, reinforcing silica and silica treating agent, at least one of said parts contains said liquid polydiorganosiloxane, and the hydrosilation catalyst and organohydrogensiloxane are located in different parts of said two-part composition.

* * * * *